(12) United States Patent
Ren et al.

(10) Patent No.: US 12,125,179 B2
(45) Date of Patent: Oct. 22, 2024

(54) IMAGE SHARPENING FOR SUBJECTS IMAGED THROUGH DISPLAY

(71) Applicant: Microsoft Technology Licensing, LLC, Redmond, WA (US)

(72) Inventors: Yonghuan David Ren, El Cerrito, CA (US); Timothy Andrew Large, Bellevue, WA (US); Neil Emerton, Redmond, WA (US); Yuqian Zhou, Urbana, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 361 days.

(21) Appl. No.: 17/755,190

(22) PCT Filed: Nov. 10, 2020

(86) PCT No.: PCT/US2020/059871
§ 371 (c)(1),
(2) Date: Apr. 22, 2022

(87) PCT Pub. No.: WO2021/108124
PCT Pub. Date: Jun. 3, 2021

(65) Prior Publication Data
US 2022/0405891 A1    Dec. 22, 2022

(30) Foreign Application Priority Data
Nov. 25, 2019    (NL) ...................... 2024302

(51) Int. Cl.
*G06T 5/00*    (2024.01)
*G06T 5/73*    (2024.01)
(Continued)

(52) U.S. Cl.
CPC .............. *G06T 5/73* (2024.01); *H04N 23/56* (2023.01); *G06T 2207/20081* (2013.01)

(58) Field of Classification Search
CPC .. G06T 5/73; G06T 2207/20081; H04N 23/56
(Continued)

(56) References Cited

U.S. PATENT DOCUMENTS 8,013,904 B2 * 9/2011 Tan ...................... H04N 9/3194
348/222.1
8,022,977 B2    9/2011 Kanade et al.
(Continued)

FOREIGN PATENT DOCUMENTS

CN    109348012 A    2/2019

OTHER PUBLICATIONS

Byford, Sam, "Oppo Unveils the World's First Under-Screen Selfie Camera", Retrieved From: https://www.theverge.com/2019/6/26/18759380/under-display-selfie-camera-first-oppo-announcement, Jun. 26, 2019, 4 Pages.
(Continued)

*Primary Examiner* — Allen H Nguyen
(74) *Attorney, Agent, or Firm* — Alleman Hall & Tuttle LLP

(57) ABSTRACT

An electronic device comprises a display, an illumination source, a camera, and a logic system. The illumination source is configured to project structured illumination onto a subject. The camera is configured to image the subject through the display, which includes collecting the structured illumination as reflected by the subject. The logic system is configured to receive, from the camera, a digital image of the subject imaged through the display. The logic system is further configured to sharpen the digital image based on the spatially resolved intensity of the structured illumination as reflected by the subject.

20 Claims, 14 Drawing Sheets

(51) Int. Cl.
*H04N 5/225* (2006.01)
*H04N 23/56* (2023.01)

(58) Field of Classification Search
USPC .................................................. 382/255
See application file for complete search history.

(56) References Cited

U.S. PATENT DOCUMENTS

| | | | |
|---|---|---|---|
| 9,756,257 B2 | 9/2017 | Tan et al. | |
| 9,817,159 B2 | 11/2017 | Hudman | |
| 9,842,549 B2 | 12/2017 | Musgrave et al. | |
| 10,366,268 B2 | 7/2019 | Mackey et al. | |
| 2009/0096994 A1* | 4/2009 | Smits | H04N 9/3155 353/30 |
| 2016/0005154 A1* | 1/2016 | Meyers | G06V 10/50 382/274 |
| 2020/0258300 A1* | 8/2020 | Schwarz | G06T 17/20 |

OTHER PUBLICATIONS

Fedewa, Joe, "Samsung Shows Off an Under-Display Camera—No Notch Needed", Retrieved From: https://www.xda-developers.com/samsung-display-under-display-camera/, Oct. 19, 2018, 10 Pages.
Mukherjee, Amritanshu, "Xiaomi's in-display camera technology explained: A clever transparent glass makes notches history", Retrieved From: https://www.indiatoday.in/technology/news/story/xiaomi-s-in-display-camera-technology-explained-a-clever-transparent-glass-makes-notches-history-1544030-2019-06-06, Jun. 6, 2019, 4 Pages.
"Search Report and Written Opinion Issued in Netherlands Patent Application No. N2024302", Mailed Date: Aug. 12, 2020, 10 Pages.
"International Search Report and Written Opinion Issued in PCT Application No. PCT/US20/059871", Mailed date: Feb. 15, 2021, 11 Pages.

* cited by examiner

IMAGE SHARPENING FOR SUBJECTS IMAGED THROUGH DISPLAY

CROSS REFERENCE TO RELATED APPLICATIONS

The present application is a U.S. National Phase of International Patent Application Serial No. PCT/US2020/059871 entitled "IMAGE SHARPENING FOR SUBJECTS IMAGED THROUGH DISPLAY", filed Nov. 10, 2020, which claims priority to Netherlands Patent Application Serial No. 2024302, filed Nov. 25, 2019, the entire contents of each of which are hereby incorporated by reference for all purposes.

BACKGROUND

In recent years, advances in complementary metal-oxide semiconductor (CMOS) technology have decreased remarkably the cost of high-fidelity optical imaging. As a result, compact, high-resolution CMOS cameras are now integrated in numerous kinds of electronic devices, such as smartphones, tablet computers, virtual- and augmented-reality headsets, game systems, and personal-computer monitors, to name only a few. Such cameras may be configured to capture still imagery and video, and, in some examples, panoramic, hyperspectral, and/or 3D imagery as well.

Despite these advances, certain challenges remain that relate to the positioning of an integrated camera relative to other components of an electronic device. One particular challenge is that of mutual alignment of the optical axes of an integrated camera and a display. When the optical axes are not mutually aligned, the user experience during video chat and video conferencing may be dissatisfying due to the difficulty of establishing eye contact between users.

SUMMARY

One aspect of this disclosure is directed to an electronic device comprising a display, an illumination source, a camera, and a logic system. The illumination source is configured to project structured illumination onto a subject. The camera is configured to image the subject through the display, which includes collecting the structured illumination as reflected by the subject. The logic system is configured to receive, from the camera, a digital image of the subject imaged through the display. The logic system is further configured to sharpen the digital image based on the spatially resolved intensity of the structured illumination as reflected by the subject.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

DETAILED DESCRIPTION

Briefly stated, one way to mutually align the optical axes of the display and the integrated camera of an electronic device is to arrange the camera directly behind the display. If the camera is to image a subject such as the user located in front of the display, then the display must be at least partially transparent. However, even a partially transparent display may include numerous, closely spaced features that diffract the light from the subject en route to the camera. The undesired effect of such diffraction is to blur the image of the subject. In order to reduce or eliminate this blur, a computer may be configured to post-process the diffraction-blurred subject image to reverse the blurring effect. Although passive image-sharpening techniques may provide some beneficial deblurring, the approach of this disclosure is to actively interrogate and spectrally correct for diffractive blurring of the acquired subject image by the display architecture. More specifically, information is gathered by projecting structured illumination onto the subject during image acquisition. The type of structured illumination used for this purpose is selected based on the expected diffractive properties of the display architecture (e.g., on the alignment and pitch of the columns of pixel elements of the display). In some examples, the optically diffractive display architecture itself may be leveraged in order to provide the structured illumination.

This active interrogation and image-sharpening approach is now presented by way of example and with reference to the attached drawing figures. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

Figure 1:
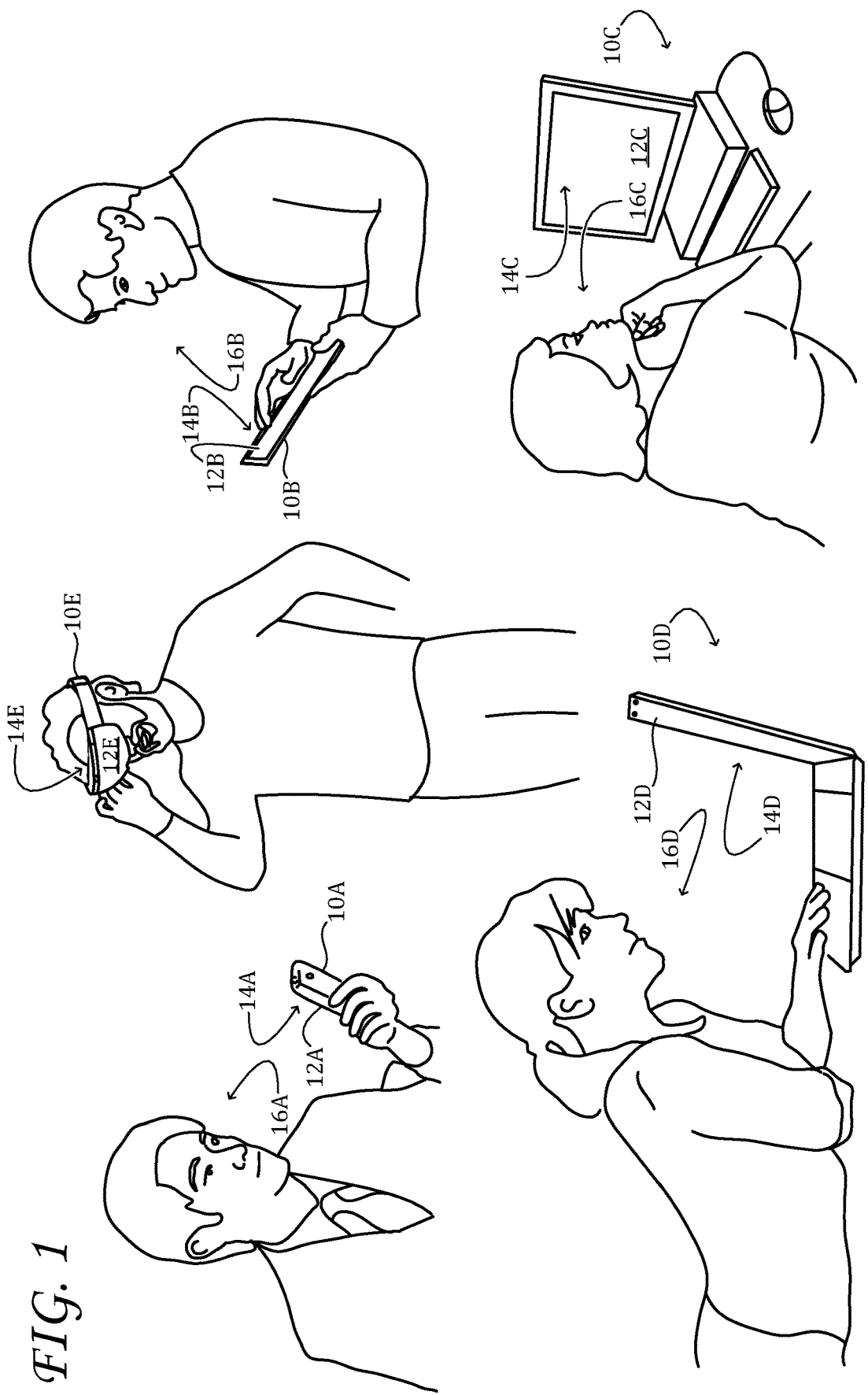
FIG. 1 shows five different example electronic devices, each having a display and an integrated camera.
Figure 2:
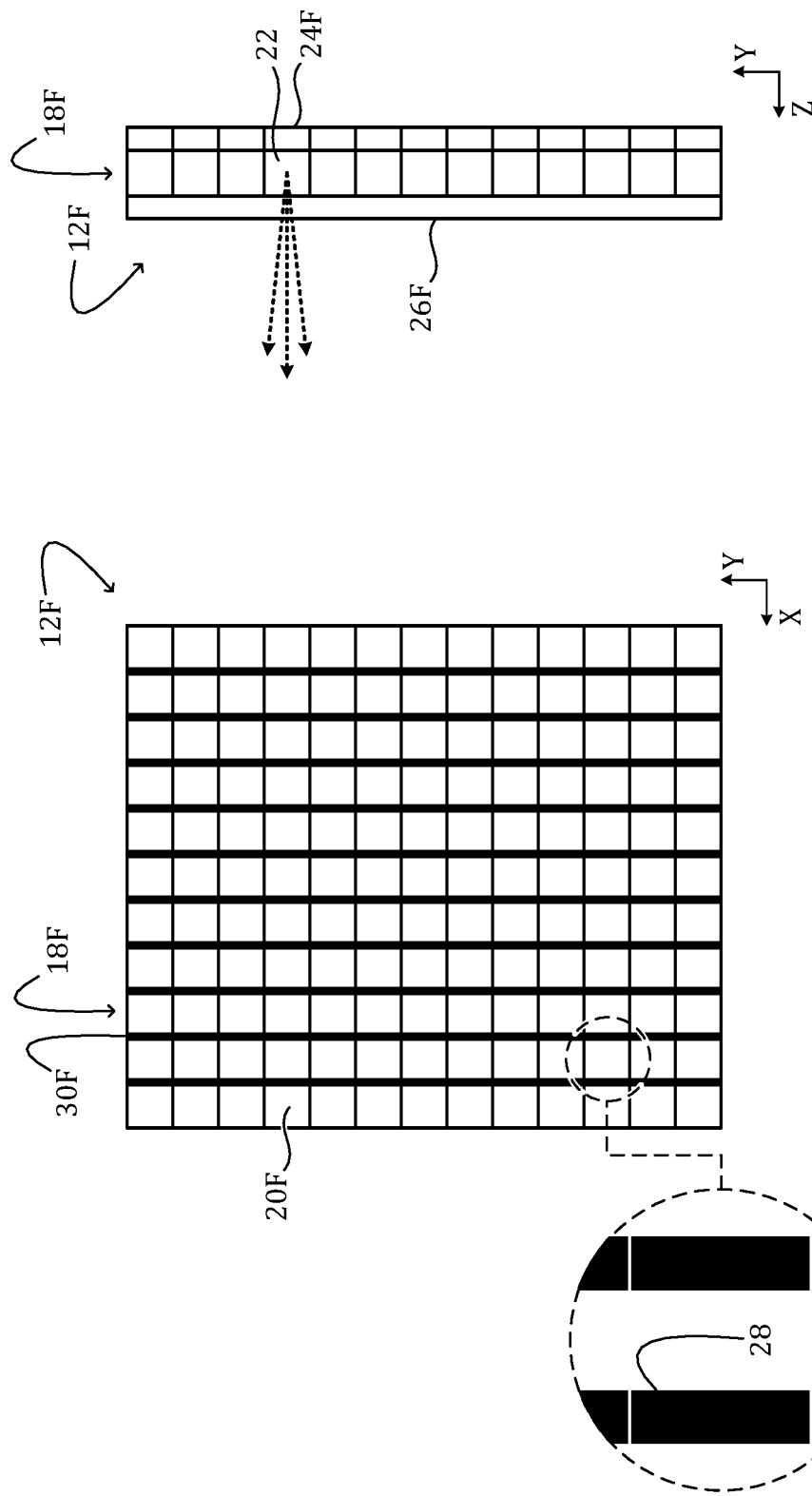
FIG. 2 shows aspects of an example organic light-emitting diode (OLED) display.
Figure 3:
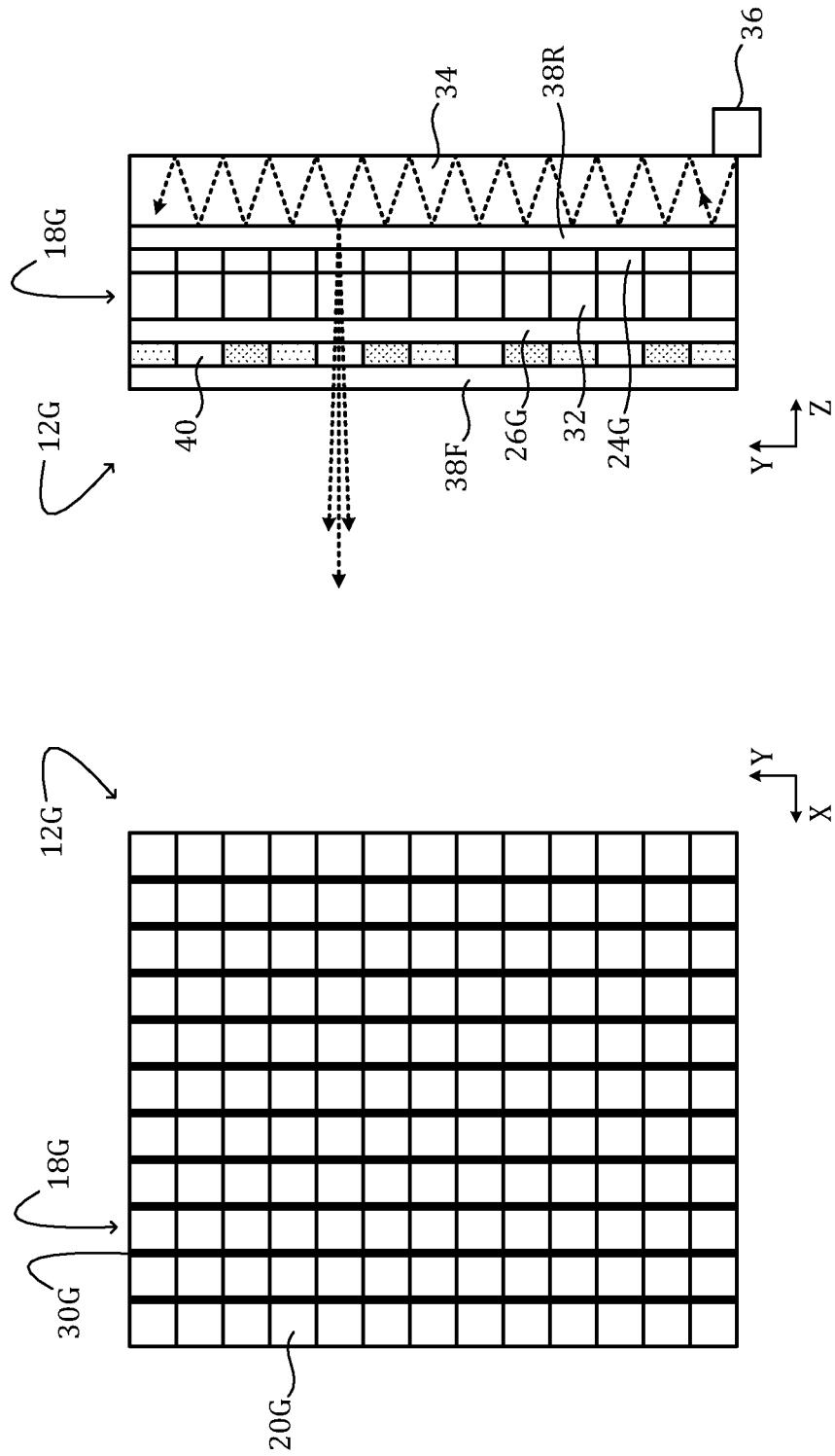
FIG. 3 shows aspects of an example liquid-crystal display (LCD).

FIG. 1 shows five different electronic devices 10, which include smartphone 10A, tablet computer 10B, desktop computer 10C, laptop computer 10D, and virtual-reality (VR) headset 10E. Each electronic device has a display 12 and a camera 14. Each camera is an integrated camera configured to image a subject 16 through the corresponding display 12. In the illustrated scenarios, the subjects 16 imaged by cameras 14 include the users of each of the respective electronic devices 10. In the particular example of VR headset 10E, the subject includes one or both of the user's eyes. Eye imaging may be enacted in order to track the user's gaze vector or focal point, for example. The examples shown in FIG. 1 are not limiting; the configurations and corresponding image-sharpening disclosed herein may be applied to imaging display devices having virtually any form factor and/or purpose. FIGS. 2 and 3 show example variants of display 12, which are applicable to electronic devices 10 of FIG. 1, among others.

FIG. 2 shows aspects of an example organic light-emitting diode (OLED) display 12F. The OLED display includes a plurality of columns 18F of emissive pixel elements 20F. Each emissive pixel element comprises an electroluminescent film 22 arranged between opposing electrodes 24F and 26F. In a color OLED display, red-, green-, and blue-emissive electroluminescent films may be distributed among the various pixel elements. Each electroluminescent film 22 emits light of a prescribed wavelength band in proportion to the forward current applied via the opposing electrodes. In a passive-matrix OLED (PMOLED) display, the opposing electrodes include row and column electrodes. In an active-matrix OLED (AMOLED) display, a discrete pixel electrode 24F is associated with each emissive pixel element 20F, and the opposing electrode 26F is shared among all of the pixel elements. Each pixel electrode of an AMOLED display is coupled to a corresponding thin-film transistor (TFT), which is driven by row- and column-drive circuitry (not shown).

Electrodes 24F and 26F and electroluminescent film 22 of OLED display 12F may be substantially transparent, such that each column 18F of emissive pixel elements 20F is substantially transparent. However, the various conduction paths 28 that lead from the row- and column-drive circuitry to electrodes 24F and/or 26F may be significantly less transparent. In order to optimize display efficiency, these conduction paths may be bundled between adjacent columns 18F. The result is that an AMOLED display may comprise relatively narrow lines 30F of reduced transmittance arranged between adjacent, substantially transparent columns 18F. As used herein, the term 'substantially transparent' characterizes an optical transmittance of 90% or greater averaged over the visible wavelength range. The term 'column' does not limit to a vertical orientation.

FIG. 3 shows aspects of an example liquid-crystal display (LCD) 12G. The LCD includes a plurality of columns 18G of polarization-rotating pixel elements 20G. Each polarization-rotating pixel element comprises a nematic liquid-crystal (LC) film 32 arranged between opposing electrodes 24G and 26G. In a passive-matrix LCD, the opposing electrodes include row and column electrodes. In an active-matrix LCD, a discrete pixel electrode 24G is associated with each pixel element 20G, and the opposing electrode 26G is shared among all of the pixel elements. Each pixel electrode of an active-matrix LCD is coupled to a corresponding thin-film transistor (TFT), which is driven by row- and column-drive circuitry (not shown).

LCD 12G includes a backlight in the form of a waveguide 34. The waveguide is configured to in-couple broadband illumination from LEDs 36 and to release the broadband illumination by controlled frustration of the total-internal-reflection (TIR) condition within the waveguide. The broadband illumination released from the waveguide may admit of a fixed polarization plane corresponding to the polarization plane of rear polarizer 38R, which, in some examples, may serve also as the out-coupling structure. In some examples, the rear polarizer may recycle the undesired polarization component back into the waveguide.

Polarization-rotating LC film 32 is arranged optically downstream of rear polarizer 38R and optically upstream of forward polarizer 38F. In this configuration, each polarization-rotating LC film rotates the polarization plane of the backlight illumination in proportion to the voltage applied between opposing electrodes 24G and 26G. When the polarization plane of the backlight illumination is rotated out of alignment with the polarization plane of forward polarizer 38F, the corresponding pixel element 20G appears dark. When the polarization plane of the backlight illumination is rotated into alignment with the polarization plane of forward polarizer 38F, the corresponding pixel element 20G appears bright. In a color LCD display, each polarization-rotating pixel LC film 32 is arranged behind a corresponding color-filter element 40 of a color-filter array.

Electrodes 24G and 26G, waveguide 34, and polarization-rotating LC film 32 may be substantially transparent, and each color-filter element 40 may be partially transparent. Accordingly, each column 18G of polarization-rotating pixel elements 20G may be partially transparent. However, the various conduction paths that lead from the row- and column-drive circuitry to electrodes 24G and/or 26G may be significantly less transparent. In order to optimize display efficiency, these conduction paths may be bundled between adjacent columns 18G. The result is that an active-matrix LCD may comprise relatively narrow lines 30G of reduced transmittance arranged between adjacent, partially transparent columns 18G. As used herein, the term 'partially transparent' characterizes an optical transmittance of 20% or greater averaged over the visible wavelength range.

Figure 4:
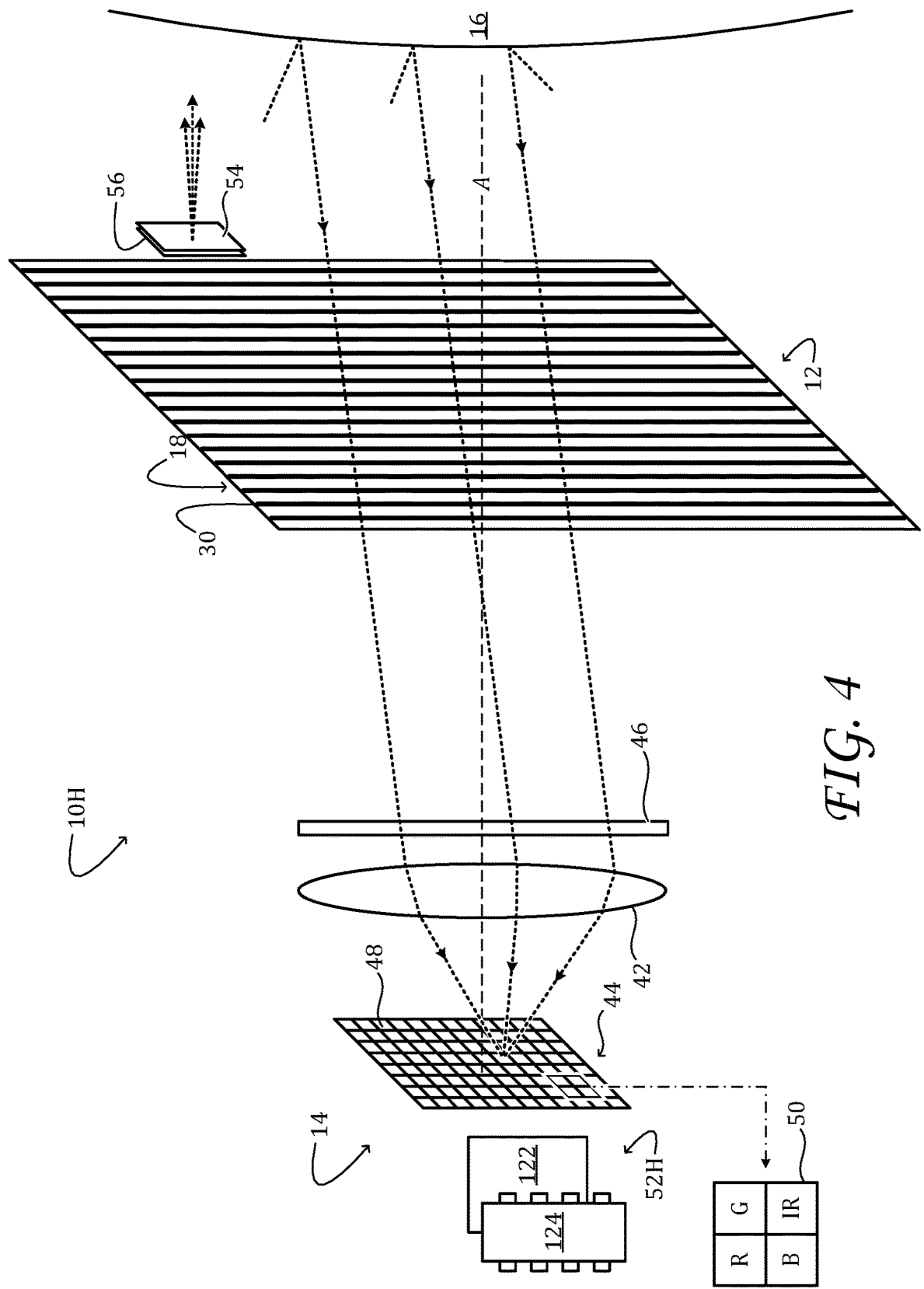
FIG. 4 shows additional aspects of an example electronic device having a display and integrated camera.

FIG. 4 shows additional aspects of an example electronic device 10H, which are common to the variants shown in FIGS. 1, 2, and 3. Camera 14 of electronic device 10H is configured to acquire a digital image of subject 16, which is arranged in front of display 12. Various kinds of digital images may be acquired, depending on the implementation. The digital image may be a color, grey-scale, or hyperspectral image, a flat image or a depth image. In some implementations, the camera may be configured to acquire a time-resolved sequence of digital images (i.e., video). The purpose of subject imaging in electronic device 10H is not limited in any way. In some examples, a digital image of the subject may be used to enable biometric (e.g., facial) recognition of the user of the electronic device. In some examples, a digital image of the subject may be used to enable video chat or video conferencing. In some examples, a digital image of the subject may be used to enable tracking of the device user's gaze vector or focal point. The gaze vector or focal point may be used in order to adjust the operating parameters of display 12 or to furnish user input, for example.

As noted above, camera 14 is configured to image subject 16 through display 12. In the illustrated example, the camera includes a collection lens (or lens system) 42, an optical sensor array 44, and a wavelength filter (or filter system) 46. Each sensor element 48 of the optical sensor array may be responsive intrinsically to a wavelength range that is broader than the wavelength range of human vision. In particular, each sensor element may be responsive to visible light in addition to infrared (IR) and/or near-infrared (NIR) light. In the illustrated example, wavelength filter 46 limits the wavelength response of each sensor element. The wavelength response may be limited, for example, to all visible wavelengths in addition to a narrow band centered on an IR wavelength of particular interest (e.g., 900±10 nanometers). As used herein, the term 'near-infrared' applies to IR wavelengths close to the wavelength range of human vision.

In order to provide color and/or hyperspectral imaging, each sensor element 48 of optical sensor array 44 may be individually filtered to transmit light of a desired wavelength range to the underlying sensor element and to reject light outside of the desired wavelength range. As shown in FIG. 4, the optical sensor array may be divided into a plurality of local sub-arrays 50, each having a red-transmitting, green-transmitting, blue-transmitting, and IR-transmitting filter element. In this example, imaging-system computer 52H may be configured to associate signal from each of the differently filtered sensor elements into its own channel—viz., into red, green, blue, and IR channels. Despite the utility of this approach, alternative hyperspectral imaging strategies are equally envisaged, including time-multiplexed visible and IR imaging using a switchable bandpass filter. This disclosure is consonant with any form of visible and IR imaging.

In electronic device 10H, the optical axis A of camera 14 passes through the center of display 12. This arrangement is amenable to accurate facial recognition and/or gaze tracking, in addition to natural-feeling video chat and video conferencing. However, it requires camera 14 to image subject 16 directly through display 12. That adaptation is possible in view of the fact that some display architectures are substantially or partially transparent (vide supra). Nevertheless, even when a display is substantially or partially transparent, image quality may be degraded for subjects imaged through a display, due to undesired optical effects caused by components of the display. Such effects may include reflection, refraction, absorption, and diffraction of light propagating from the subject to the camera. Briefly, reflection reduces the brightness of the subject image in dependence on the collection angle, and refraction may distort the subject image, if the display is curved. This disclosure is concerned primarily with the effects of diffraction by the display componentry.

As noted hereinabove, a pixel-based display 12 may include columns 18 of relatively high optical transmittance, where display light is released, alternating with lines 30 of comparatively low optical transmittance, where electronic circuit elements are arranged. In a high-resolution display, lines 30 are spaced closely together (e.g., 500 lines per inch), resembling lines on a diffraction grating. Accordingly, from the point of view of camera 14, display 12 may embody a transmissive diffraction grating.

Figure 5:
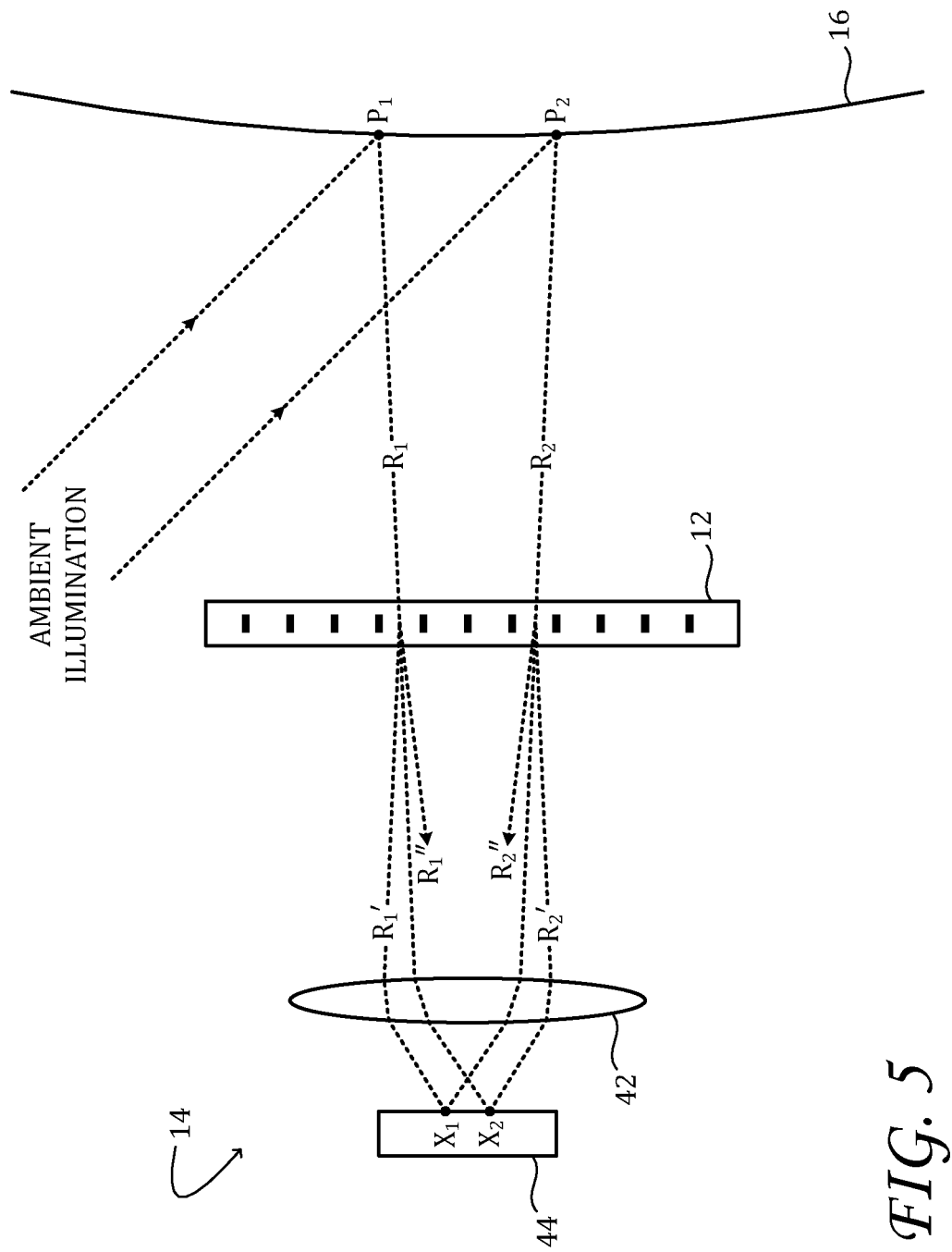
FIG. 5 illustrates diffraction by a display of ambient illumination reflected by a subject.

FIG. 5 illustrates diffraction by display 12 of ambient illumination reflected by subject 16. Rays $R_1$ and $R_2$ reflect from different points, $P_1$ and $P_2$, on the subject. These rays propagate at correspondingly different angles toward collection lens 42 of camera 14. In display 12, a portion of each ray may be lost to absorption, and another portion may be split into a continuum of diffracted rays. For instance, diffracted rays $R_1'$ and $R_1''$, among others, are split off from parent ray $R_1$. Each diffracted ray is collected at an angle that differs from that of its parent ray and is received, therefore, by a sensor element that differs from the sensor element receiving the parent ray. In the illustrated example, sensor element $X_1$ receives diffracted ray $R_2'$ in addition to parent ray $R_1$, and sensor element $X_2$ receives diffracted ray $R_1'$ in addition to parent ray $R_2$. Accordingly, diffraction results in an observed diffusion of signal among the various sensor elements, or, equivalently, a loss of certain high spatial-frequency components of the subject image. The sharpness of the subject image is therefore degraded. Furthermore, absorption of light by the display will result in an overall loss of image brightness. For an LCD display in operation, the brightness attenuation cannot be assumed invariant, but may vary from frame to frame, depending on the image content being displayed.

The scenario illustrated in FIG. 5 extends readily to the general case of N sensor elements 48, where the observed signal value $S_i'$ from sensor element i may be expressed as a linear combination of uncorrupted signal values $S_j$ of each of the N sensor elements, with unknown coefficients $a_{i,j}$, $$S_i' = \sum_j^N a_{i,j} S_j \qquad (\text{eq 1})$$

Figure 6:
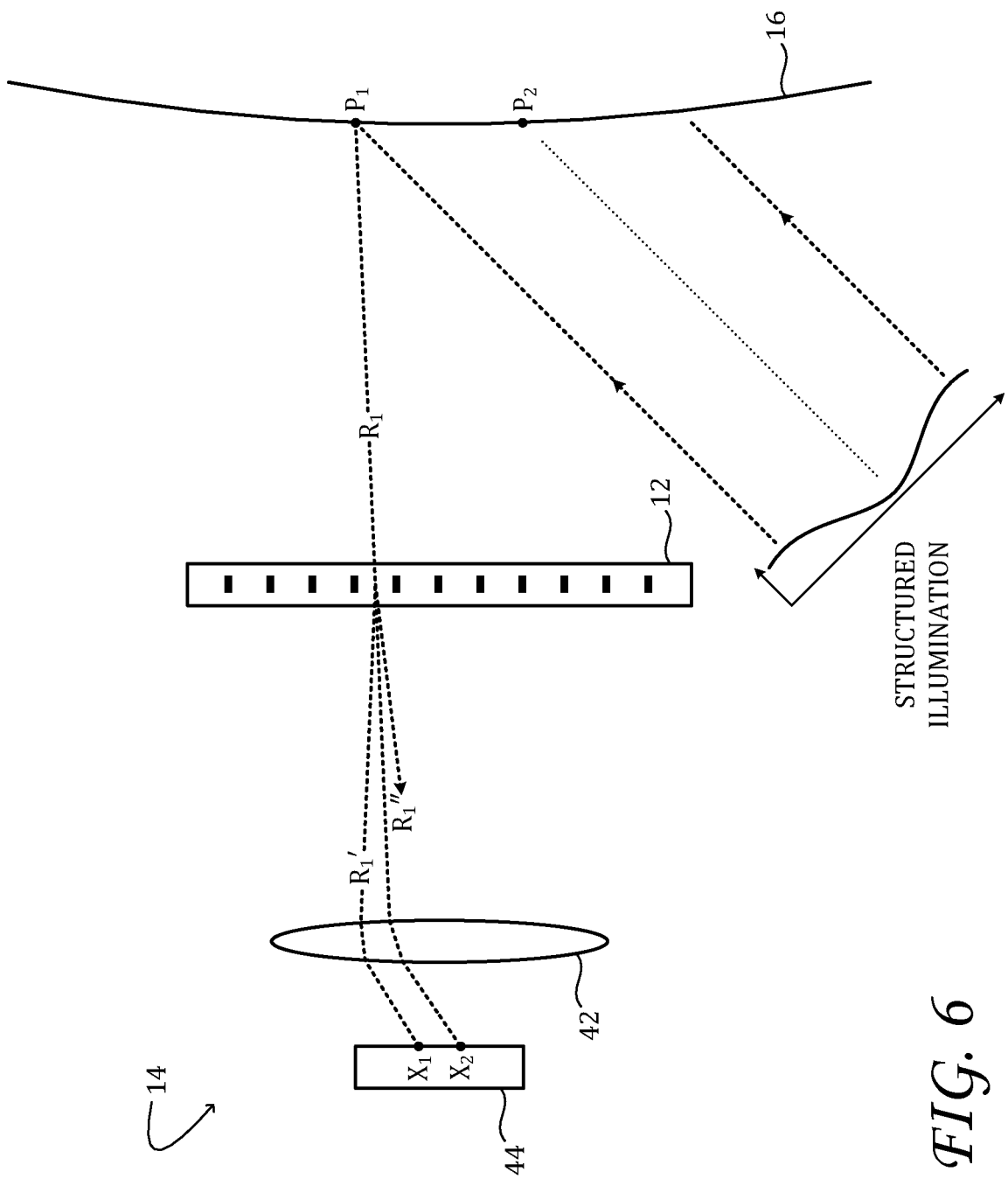
FIG. 6 illustrates diffraction by a display of structured illumination reflected by a subject.

Eq 1 represents one of a series of linear equations that can be solved simultaneously, provided that sufficient data relating the observed and uncorrupted signal values is available. As described in further detail herein, sufficient data may be obtained pursuant to a novel and non-obvious approach wherein subject 16, during image acquisition, receives structured illumination. The pattern of the structured illumination may be based particularly on the optically diffractive structure of display 12. For instance, if the display includes a series of substantially or partially transparent columns separated by attenuating, parallel lines, then the structured illumination may take the form of parallel bright columns of light, periodically spaced. Moreover, the bright columns of the structured illumination may be oriented parallel to the optically diffractive pixel columns. FIG. 6 provides a simplified example to illustrate the effect of this approach.

In FIG. 6, subject 16 is illuminated by a series of narrow bright columns aligned parallel to the optically diffractive pixel columns of display 12. The drawing shows only two bright columns, but a structured projection would typically include numerous alternating bright and dark features. Under this structured illumination, point $P_1$ is illuminated, while point $P_2$ remains dark. Accordingly, there is no reflected ray akin to ray $R_2$ of FIG. 5, which originates at $P_2$ but contributes to the intensity recorded at $X_1$. From this simple example, the skilled reader may appreciate that judicious structured illumination of the subject can provide information sufficient to enable the entire coefficient matrix $\{a_{i,j}\}$ in eq 1 to be determined for an arbitrary number N of sensor elements 48. From the transpose $\{a_{i,j}\}^T$ of the coefficient matrix, transposed coefficients $b_{i,j}$ may be computed. The transposed coefficients enable extraction of uncorrupted signal values $S_i$ from the observed signal vector $S_i'$, according to $$S_i = \sum_j^N b_{i,j} S_j' \qquad (\text{eq 2})$$

Accordingly, a digital image of subject 16 acquired under structured illumination may furnish data that reveals the detailed effect of optical diffraction on the observed signal and can be used to reverse that effect.

Figure 7:
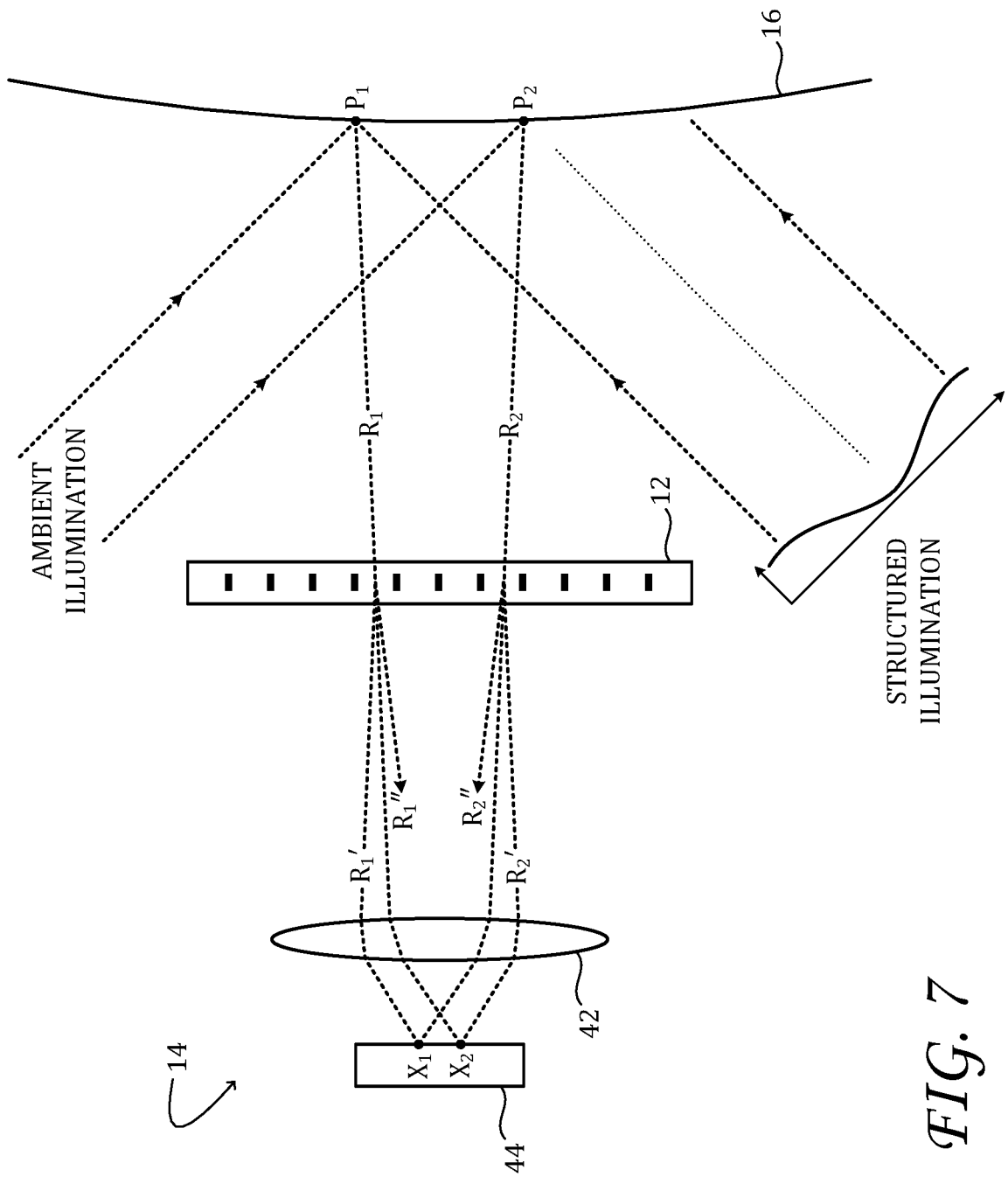
FIG. 7 illustrates diffraction by a display of structured and ambient illumination reflected by a subject.

Illustrated in FIG. 7 is a more complex scenario in which the subject receives both structured and non-structured (e.g., ambient) illumination of the same wavelength. For ease of explanation, it may be assumed that subject 16 in FIG. 7 is exposed to the different forms of illumination during different time slices—i.e., in a time-multiplexed manner. Rays carrying structured and non-structured illumination from the same point follow the same path to collection lens 42. Such rays are diffracted identically by display 12. Accordingly, the same coefficients $a_{i,j}$ that describe optical diffraction and the same coefficients $b_{i,j}$ that enable recovery of the uncorrupted signal apply equally to the structured and the non-structured illumination. Any image correction, therefore, may be computed using data acquired during a structured time slice and then used to reverse the diffractive effect on data acquired during a subsequent, non-structured time slice.

In some implementations, the subject image may be sharpened in the spatial- and/or angular-frequency domains. For example, the sinusoidal illumination shown in FIGS. 6 and 7, multiplies each signal value $S_i$ of subject image by a factor $(1+\sin(2\pi \times F))/2$, where x is the horizontal distance across the image, and F is the spatial frequency of the imaged structured illumination. When the subject image is Fourier transformed into the spatial-frequency domain, this multiplicative factor becomes a convolution function comprising a sum of three delta terms, one each at f=−F, 0, and +F. Accordingly, the spatial-frequency spectrum of the subject image acquired under the structured illumination is a superposition of the non-convoluted component spectrum of the subject image across the range of spatial-illumination frequencies, in addition to a pair of identical component spectra upshifted and downshifted by f=±F.

In view of the above analysis, three successive images of the subject may be acquired under structured illumination of the same spatial frequency F, but a different phase offset for each image. Across the triad of images, for example, the above multiplicative factor may vary from:

$$(1+\sin(2\pi \times F))/2, \text{to} \quad (eq\ 3)$$

$$(1+\sin(2\pi \times F+2\pi/3))/2, \text{to} \quad (eq\ 4)$$

$$(1+\sin(2\pi \times F+4\pi/3))/2, \quad (eq\ 5)$$

yielding correspondingly different convolution functions (i.e., different magnitudes of the delta components) in the Fourier domain. This example provides a system of thee equations in three unknowns, from which the non-convoluted component spectrum of the subject image may be determined. The spectrum includes information across the range of spatial frequencies of the structured illumination, even if some spatial frequencies in that range are attenuated by the display. An inverse Fourier transform may then be used to return the subject image in the spatial domain.

The applicability of the image correction over plural temporal channels, as noted above, extends also to other types of channels, such as polarization channels and—subject to a caveat—to wavelength channels. For instance, if subject 16 were irradiated concurrently with non-structured blue light and structured red light, it would be possible via color imaging to compute an image correction based on the structured red light and to apply that correction to recover uncorrupted signal corresponding to the non-structured blue light. The caveat is that any diffracting feature will diffract a ray of blue light to a higher angle than a colinear ray of red light.

Figure 8A:
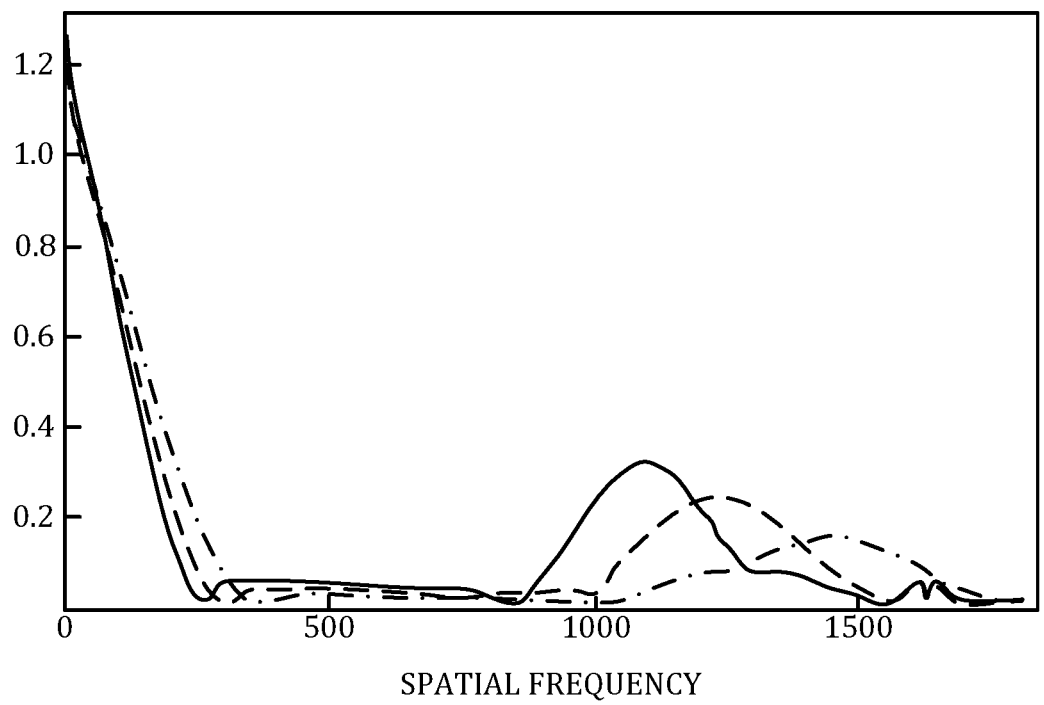
FIG. 8A is an experimentally determined plot of the modulation transfer function (MTF) of an example OLED display for three different colors of visible light.
Figure 8B:
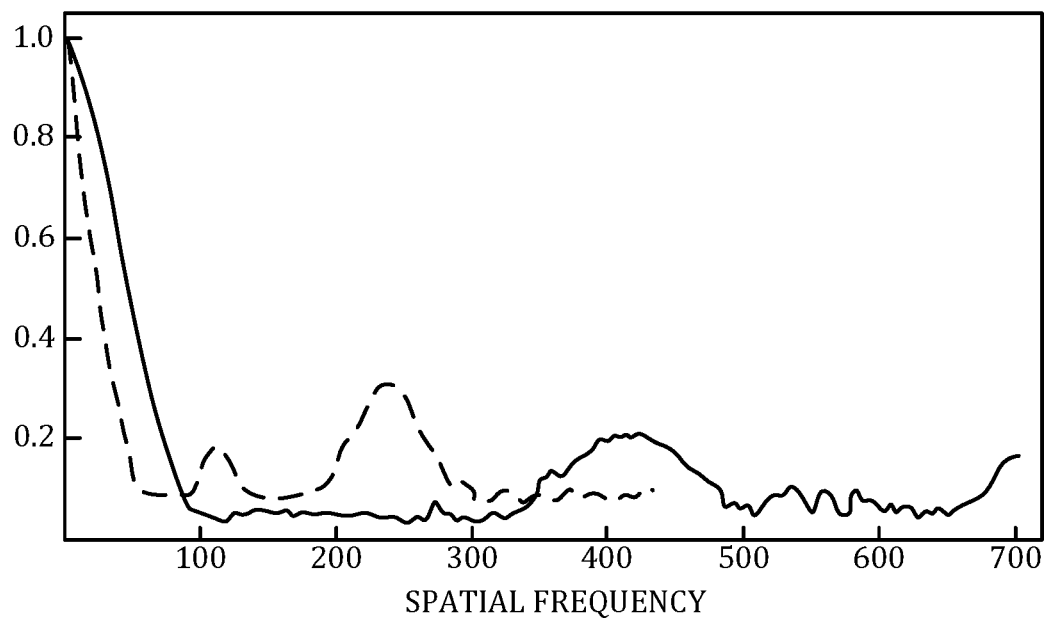
FIG. 8B is an experimentally determined plot of the MTF of an example OLED display for broadband visible and infrared light.

This effect is borne out in FIG. 8A, which shows an experimentally determined plot of the modulation transfer function (MTF) of an example OLED display 12F for three different colors of visible light. The solid curve corresponds to red light, the dashed curve corresponds to green light, and the dot-dashed curve corresponds to blue light. Likewise, FIG. 8B shows an experimentally determined plot of the MTF of the same OLED display for visible versus IR light. Here, the solid curve corresponds to visible light, and the dashed curve corresponds to IR light. In implementations employing color and/or hyperspectral imaging, MTF data may be used in the spatial-frequency domain to scale the non-convoluted component spectrum by the appropriate amount in each color and/or IR channel, and thereby provide a chromatic image correction. In this manner, the MTF data makes it possible to interrogate the diffractive effects of a display over one wavelength range but provide a correction applicable over a different and non-overlapping wavelength range. In some examples, the MTF data makes it possible to interrogate the diffractive effect using structured IR illumination and then provide a correction applicable to each of a series of visible wavelength bands.

In general, neither the wavelength content of the structured illumination nor the manner of projecting the structured illumination are limited in any way. In some examples, the structured illumination may comprise visible illumination. However, structured, visible illumination may be distracting to users, in some scenarios, and may be challenging to distinguish from a background of bright, ambient illumination. Accordingly, the structured illumination alternatively may comprise IR or NIR illumination.

In some examples, a structured optical projection may be formed by illuminating an interference structure, such as a hologram, with light of a monochromatic or narrow wavelength-band. Structured illumination formed in this manner comprises one or more defined spatial frequencies, which can be selected based on the spatial frequency of the optically diffractive structure of the display. Transmissive and reflective holograms are equally envisaged, as are non-holographic structured projections. In the example configuration of FIG. 4, subject 16 receives structured illumination from transmissive hologram 54 in addition to ambient, non-structured illumination. The hologram is illuminated by hologram illuminator 56, which may comprise an IR illumination source. In this manner, the subject receives ambient visible illumination in addition to structured IR illumination.

In imaging subject 16 through display 12, camera 14 collects the structured and the ambient illumination, both reflected by the subject and subsequently diffracted by the optically diffractive structure of the display. The resulting digital image acquired by the camera may be represented as a numeric array with an observed signal value $S_i'$ provided for each of a set of pixels $(X, Y)_i$. The X, Y position of each pixel of a digital image is mapped to an associated sensor element 48 of sensor array 44, and, via collection lens 42, to a corresponding locus of subject 16. In some implementations, the mapping of image pixels to sensor elements may be a 1:1 mapping, but other mappings may be used as well, such as 1:4, 4:1, and others.

The dimensionality of each $S_i'$ value of a digital image is not particularly limited. In some examples, $S_i'$ may be a real- or integer-valued scalar that specifies the brightness of pixel $(X, Y)_i$. In some examples, $S_i'$ may be a vector of real or integer values that specifies the 'color' of pixel $(X, Y)_j$ using scalar component values for red, green, blue, and IR channels, for instance. In some examples, $S_i'$ may include a complex value $a+b\sqrt{-1}$, where a and b are integers or real numbers. A complex valued $S_i'$ may be used, for instance, to represent the signal response of the sensor elements of a time-of-flight (ToF) camera that employs continuous-wave (CW) modulation and temporal phase estimation to resolve radial distance. In other examples, a complex valued $S_i'$ may be used to represent both the magnitude and the phase offset of a signal acquired in plural exposures under structured illumination of different spatial phase offsets. In particular, a complex data structure may be used to represent image data from the plural exposures under illumination differing in the spatial phase offsets (as in eqs 3-5). In these and other examples, a single digital image may record, in separate channels, the spatially resolved intensity of the ambient and the structured illumination as reflected by the subject and subsequently diffracted by the optically diffractive structure of the display. In still other examples, a plurality of corresponding (i.e., co-registered) digital images may be used to represent the multichannel image data.

Continuing in FIG. 4, any source of structured illumination, such as hologram illuminator 56 and transmissive hologram 54, may be embedded virtually anywhere on electronic device 10H, such as on the periphery of display 12. In a handheld electronic device, however, there is a risk that the user's hands may eclipse a peripherally arranged hologram and thereby block the projection of the structured illumination. Furthermore, it is advantageous for the hologram to be collocated, or nearly so, with camera 14. If the origin of the structured illumination is remote from the camera, then the structured reflection from different points on the subject may, from the point of view of the camera, appear to comprise different spatial frequencies, which would complicate image recovery in the Fourier domain. To overcome these difficulties, any, some, or all of the diffractive features of display 12 may be double-purposed so as to provide structured illumination when exposed to monochromatic or narrow-band illumination. Such diffractive features may be the same features that cause the undesired diffractive effect which is reversed according to the configurations and methods herein.

Figure 9B:
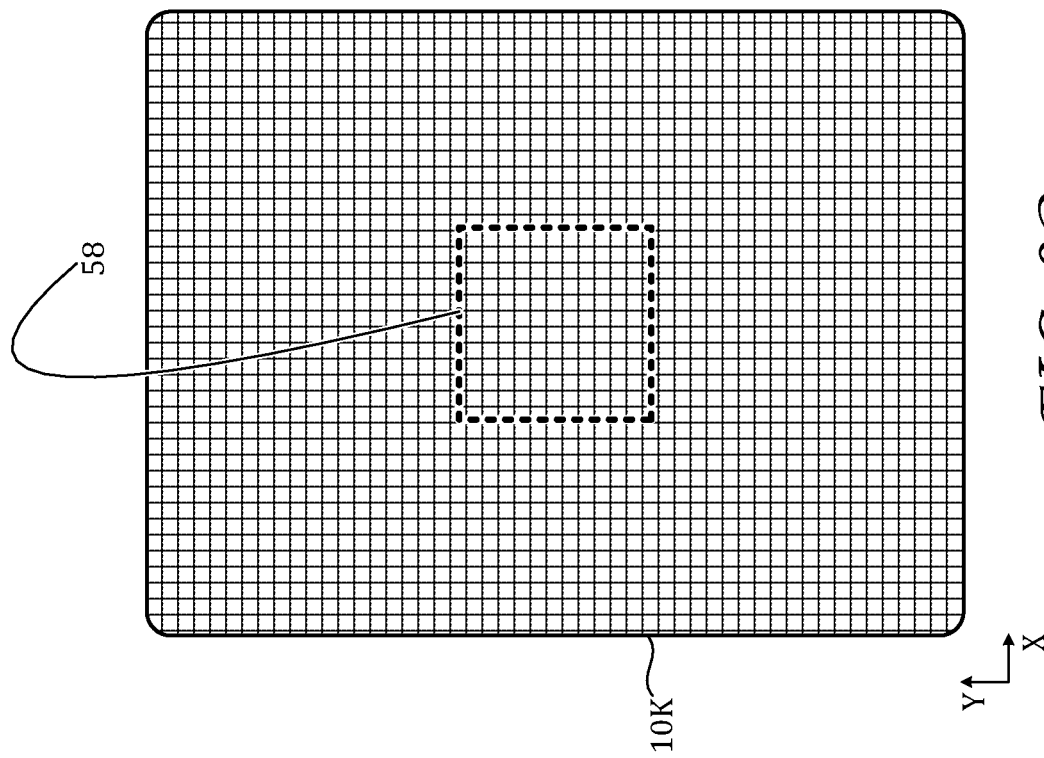
FIGS. 9A and 9B show aspects of another example electronic device having a display and an integrated camera.
Figure 9A:
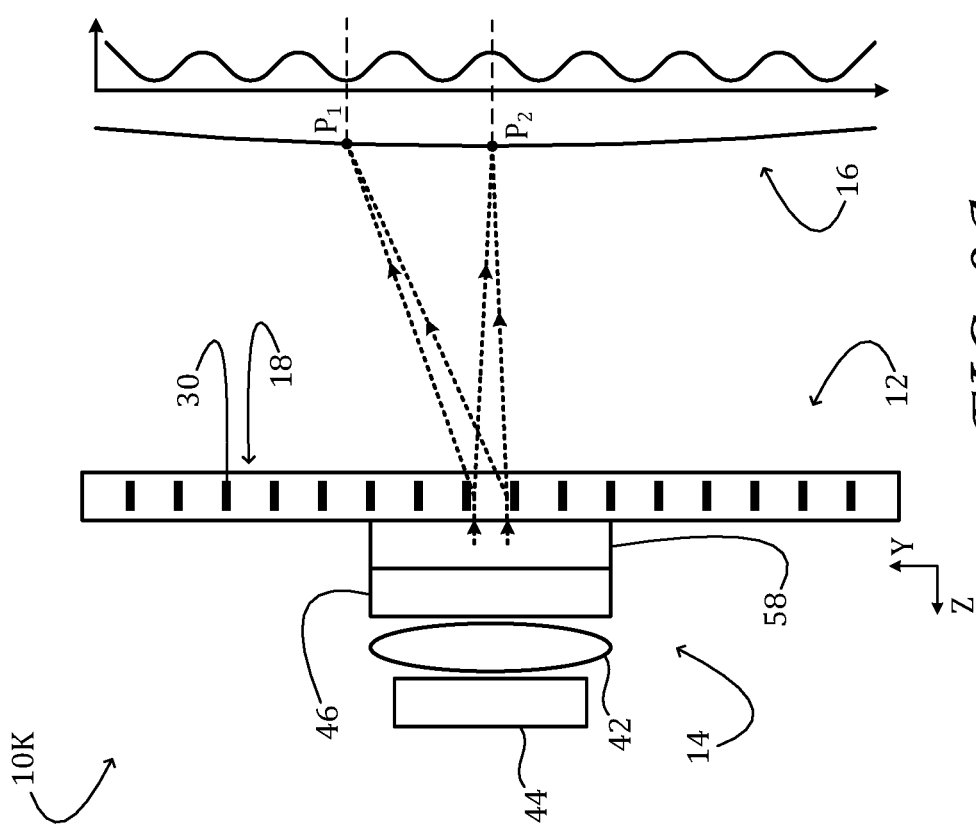

More specifically, FIGS. 9A and 9B show aspects of an example electronic device 10K in which both the camera and the source of the structured illumination are arranged behind display 12. Electronic device 10K includes a column-edge illuminator 58 configured to coherently illuminate opposing edges of substantially or partially transparent columns 18 of pixel elements of the display. In examples in which opposing edges of a single column are illuminated, a one-dimensionally periodic interference pattern—i.e., a regular pattern of alternating bright and dark bands is projected onto the subject. The column-edge illuminator projects structured illumination of an angular frequency $a/\lambda$, where a is the width of the illuminated column 18, and $\lambda$ is the emission wavelength of the column-edge illuminator. Such illumination will 'mix down' angular scene frequencies from $a/\lambda$ to zero, providing acceptably high spatial-frequency content for the purposes herein, except in configurations in which the column width a is quite narrow in comparison to the pixel pitch d. In a typical example in which $a \geq d/3$, nearly all of the relevant spatial frequencies can be recovered using an illumination frequency of $a/\lambda$. By contrast, column-filling, coherent illumination any pair of columns (akin to Young's double-slit experiment) would yield an interference pattern having an angular-frequency cutoff at $a/\lambda$, providing very little illumination intensity at angular frequencies useful for interrogating and reversing the diffractive blurring by the display architecture. Accordingly, there is a significant advantage in providing coherent, edge-centered illumination of an aperture size which is small in comparison to the width a of any illuminated column.

As shown in FIG. 9A, column-edge illuminator 58 illuminates a plurality of opposing edges of display columns 18. This approach leaves the structured illumination pattern unchanged but provides increased illumination output. In some examples, accordingly, the column-edge illuminator may illuminate the opposing edges of ten or more regularly spaced columns in a small area behind the center of display 12, as shown in FIG. 9B. In an 8 by 12 centimeter (cm) smartphone display, for instance, the column-edge illuminator may comprise a 1-cm square. In this and other examples, a column-edge illuminator positioned appropriately with respect to the optically diffractive structure of the display may be configured to project structured illumination onto subject 16 by illuminating the optically diffractive structure of the display.

Figure 10:
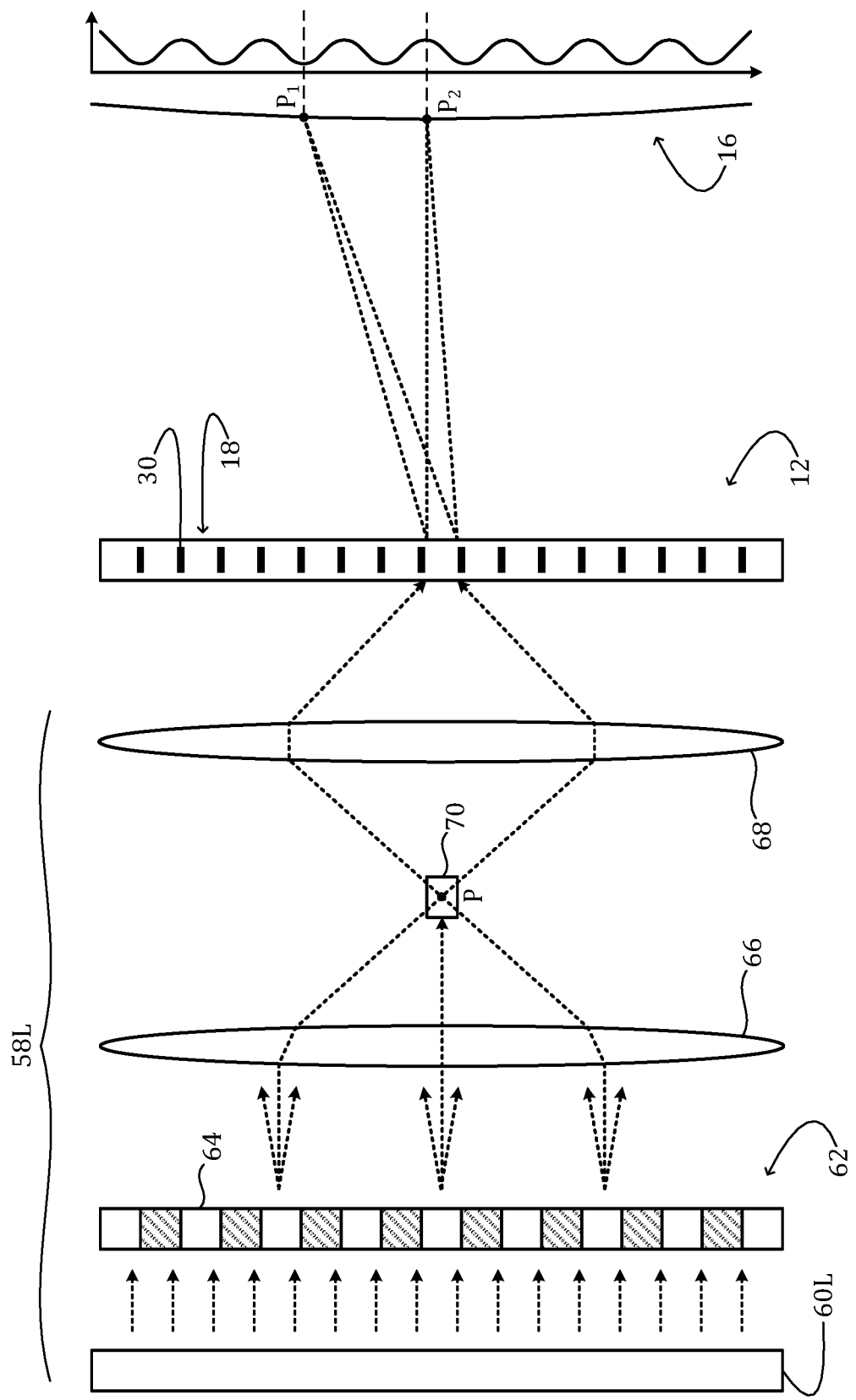
FIG. 10 shows conceptual aspects of an example column-edge illuminator of an electronic device having a display and an integrated camera.

FIG. 10 shows additional aspects of an example column-edge illuminator at a conceptual level. Column-edge illuminator 58L includes a laser source 60L, such as a laser diode. The collimated wavefront from the laser source is directed to spatial modulator 62, which presents a spatial modulation pattern (vide infra), similar in pitch and alignment to the optically diffractive structure of display 12. Each modulation element 64 of the spatial modulation pattern may be small enough to diffract the collimated wavefront. The spatially modulated, collimated wavefront is captured by focal lens 66, which images the wavefront onto focal point P, arranged within the collection cone of relay lens 68.

The type of spatial modulation enacted by spatial modulator 62 is not particularly limited. In examples in which the spatial modulator presents an alternating series of transparent and opaque bands, an aperture stop 70 may be arranged at focal point P to block the zeroth-order diffraction component of the spatially modulated wavefront. In examples in which the spatial modulator includes alternating zones of unequal phase retardance, the zeroth-order diffraction component may be eliminated by design, such that no aperture stop is needed. One example spatial-modulation pattern to achieve this effect is a square-wave pattern with alternating phases of $\pm \pi/2$; alternative spatial-modulation patterns are also envisaged.

Relay lens 68 of column-edge illuminator 58L images the spatially modulated wavefront onto the optically diffractive structure of display 12. The column-edge illuminator is aligned such that each modulation element 64 of spatial modulator 62 is imaged onto a substantially or partially transparent column 18 of the display. However, due to the fact that the zeroth-order diffraction component is eliminated, virtually no light from the wavefront is imaged onto the middle of any substantially or partially transparent column 18. Instead, the light from the wavefront is imaged onto opposing edges of one or more of the illuminated columns, close to attenuating lines 30.

Despite the utility of the column-edge illuminator configuration of FIG. 10, alternative configurations that divide a coherent wavefront and then refocus the divided portions onto opposing edges of display columns are also envisaged. Such configurations may include, for example, a biprism angled so as to create two beams at a slight angle to one another, with subsequent focusing onto the display columns. Such configurations may include, in other examples, a beam splitter and interferometer—e.g., a Michelson or Mach-Zehnder interferometer—to produce two angled beams. In some variants of this example, a phase-shifter (e.g., a liquid crystal device) may be included in order to shift the phase of the pattern. In other variants, separate systems phase-shifted relative each other may be provided and may be operated in a time-multiplexed manner.

Figure 11:
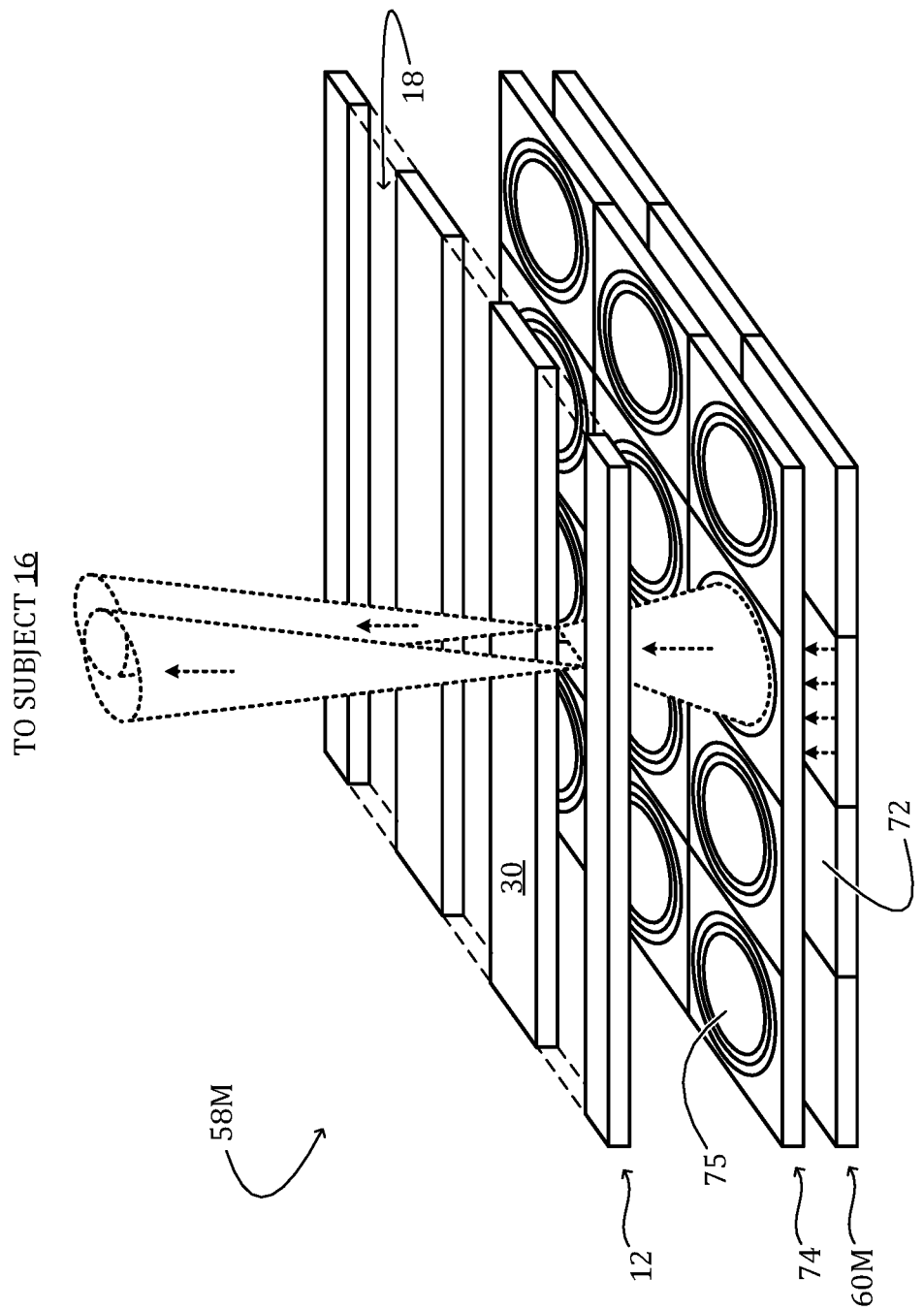
FIG. 11 shows additional aspects of an example column-edge illuminator of an electronic device having a display and an integrated camera.

FIG. 11 shows aspects of a more particular, though non-limiting, example of a column-edge illuminator consonant with the conceptual features illustrated above. In column-edge illuminator 58M of FIG. 11, the laser source takes the form of a regular laser array 60M of vertical-cavity surface-emitting laser (VCSEL) diodes 72. Such an array may deliver tens to thousands of milliwatts of irradiance distributed over an extended area, to provide a safer ocular environment for the user. Each VCSEL diode emits coherent radiation, suitable for the illumination of opposing edges of a single pixel column 18 of display 12, but the temporal phase of the individual diodes is uncoupled. Mutual interference across different columns is thereby avoided.

Hologram array 74 is arranged optically downstream of laser array 60M. The hologram array includes an array of phase-based spatial modulator elements 75 arranged in registry with corresponding VCSEL diodes 72 of laser array 60M. Each phase-based spatial modulator element is configured to enact the same optical transformation described above for modulation elements 64 of FIG. 10. In some examples, as noted hereinabove, projection of three different phase-shifted patterns of structured illumination may be desired, in order to facilitate image sharpening in the Fourier domain. In such examples, each pair of opposing edges of a pixel column 18 may be illuminated by three different VCSEL diode+spatial modulator element, which are operated in a time-multiplexed manner and synchronized to image acquisition by camera 14.

Returning briefly to FIG. 4, imaging-system computer 52H is configured to receive one or more corresponding digital images from camera 14 and to sharpen at least one of the one or more corresponding digital images based on the spatially resolved intensity of the structured illumination as reflected by the subject and subsequently diffracted by the optically diffractive structure of the display. In some examples, the act of sharpening at least one of the one or more corresponding digital images may include reversing a diffractive effect of the optically diffractive structure on the at least one of the one or more corresponding digital images.

Figure 12:
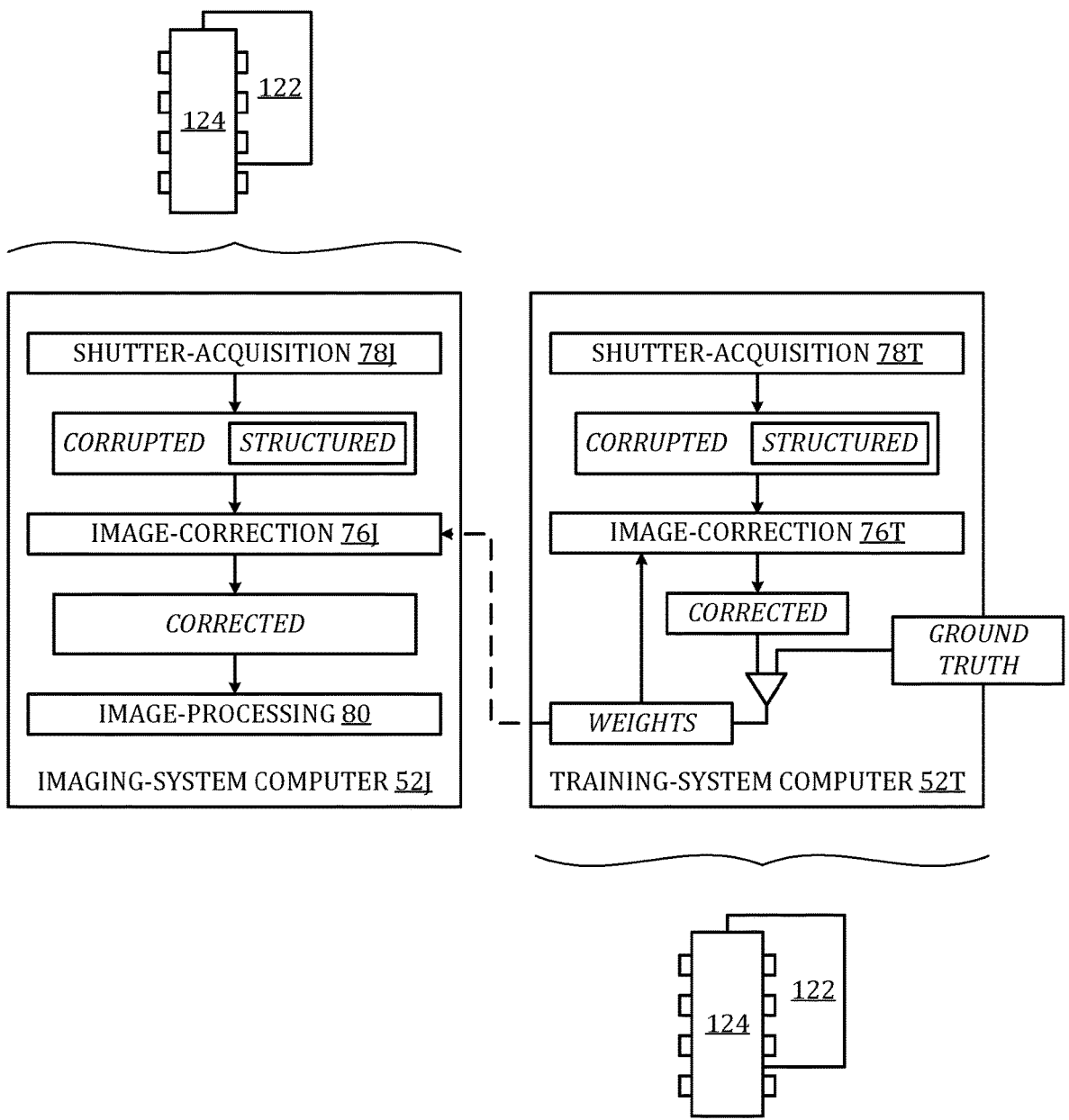
FIG. 12 shows aspects of an example imaging-system computer and an example training-system computer.

In some examples, image sharpening may be implemented via Fourier analysis, as described hereinabove. In some examples, image sharpening may be implemented via a machine-learning approach. FIG. 12 shows aspects of an example imaging-system computer 52J that instantiates a trained image-sharpening machine 76J. The image-sharpening machine is trained to output at least one sharpened subject image based on one or more corresponding, corrupted subject images received from shutter-acquisition engine 78J. The at least one sharpened subject image is then provided to image-processing engine 80 for further processing—e.g., facial recognition or other biometric analysis, gaze tracking, etc. The one or more corresponding, corrupted subject images may include non-structured visible and structured IR components, as described above.

Figure 13:
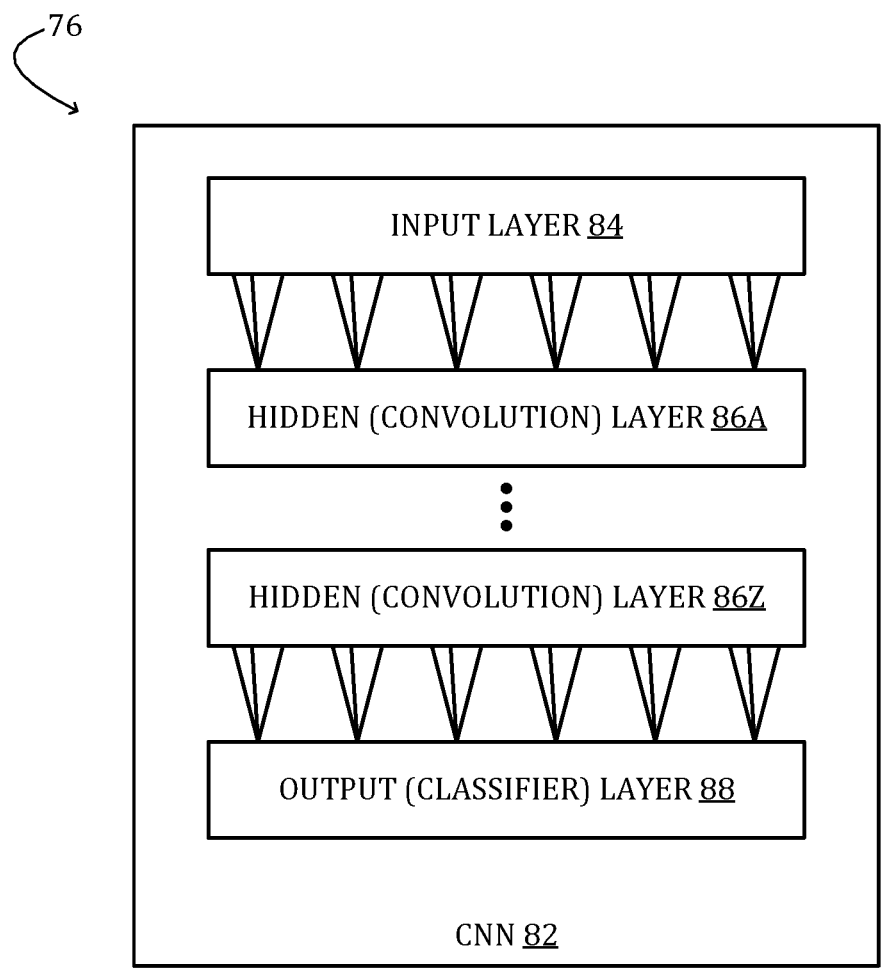
FIG. 13 shows aspects of an example convolutional neural network (CNN) of an imaging-system computer.

In one example, image-sharpening machine 76J may take the form of a fully convolutional neural network (CNN) 82, as shown in FIG. 13. CNN 82 includes an input layer 84, a series of hidden layers 86, and an output layer 88. Each layer of the CNN includes an array of logic constructs called 'neurons'. Each neuron i of the input layer may correspond to coordinates $(X, Y)_i$ of a particular color or IR channel of a corrupted image provided as input. During operation of the CNN, each signal value $S_i'$ of a corrupted image is received at the node corresponding to coordinates $(X, Y)_i$ of input layer 84 and is transformed successively through each of the series of hidden layers 86. Each neuron of a hidden layer receives its input from neurons of the layer above, enacts a logic operation on the input, and passes an output to neurons of the layer below. Each neuron of output layer 88 corresponds to a corrected signal value $S_i$ attached to coordinates $(X, Y)_i$ for the relevant color or IR channel.

In contrast to the neurons of a generic neural network, each neuron of CNN 82 receives input only from the neuron directly above it, or from a close neighbor of that neuron. This feature reflects the fact that the corrected signal value $S_i$ for coordinates $(X, Y)_i$ of a digital image depends more strongly on information close to $(X, Y)_i$ than on information from distant parts of the digital image.

Among the hidden layers 86 of CNN 82 are one or more convolution, or filter, layers. Each convolution layer enacts a filtering operation by computing a dot product between its vector of inputs and a filter vector of the same dimensions. The elements of each filter vector are adjustable parameters called 'filter weights'. During training of the CNN, the filter weights are optimized in a closed-loop manner, so as to cause the CNN to converge onto independently supplied, ground-truth (i.e., uncorrupted) images based on one or more corresponding, corrupted training images provided as input. In some examples, a global error is computed for the set of training images based on a trial set of filter weights, by comparing each output to the corresponding ground-truth image. Then each filter weight is adjusted so as to reduce the global error according to a back-propagation method. To facilitate back propagation, the filtering and/or other logic function enacted by each neuron may be required to be differentiable with respect to an associated filter weight. In some examples, each neuron may include logic configured to compute its own derivatives. Such derivatives may be used in a parameter optimization procedure, such as the 'steepest descent' method, among others.

CNN 82 may include a large number of filters arranged in hidden layers 86. In contrast to a generic neural network, where the filter vectors of each neuron are optimized independently, the filter vectors in CNN 82 may be constrained to reflect the inherent similarities among the individual sensor elements of a sensor array. Provided that a sufficient quantity of training data is made available during the training phase, a CNN can potentially learn to properly correct for the corrupting influence of the display through which the subject is imaged. Moreover, CNNs are naturally invariant to translational shifting in the component images at the input layer, providing tolerance to variances and offsets among the various component images (training and operational).

Returning now to FIG. 12, training-system computer 52T supports the training of image-sharpening machine 76J of imaging-system computer 52J. To this end, training-system computer 52T is configured to instantiate a trainable image-sharpening machine 76T. Image-sharpening machine 76J is configured to receive one or more corrupted training images from shutter-acquisition engine 78T and to return at least one corresponding, sharpened image. Substantially identical cameras (not shown) may be operatively coupled each to the shutter-acquisition engine of the imaging-system and training-system computers.

More particularly, training-system computer 52T applies trainable image-sharpening machine 76T to the one or more corrupted training images, seeking to reproduce the corresponding ground-truth image. To this end, the training-system computer is configured to compute the global error between the output of the trainable classification machine (e.g., output layer 88 of CNN 82) and a corresponding ground-truth image. The training-system computer is configured to incrementally refine the filter weights via back propagation. At the conclusion of the training process, the refined filter weights are supplied to image-sharpening machine 76J of image-processing computer 52J. In this manner, the image-sharpening machine is trained to reverse the effect of optical diffusion by the display architecture.

Figure 14:
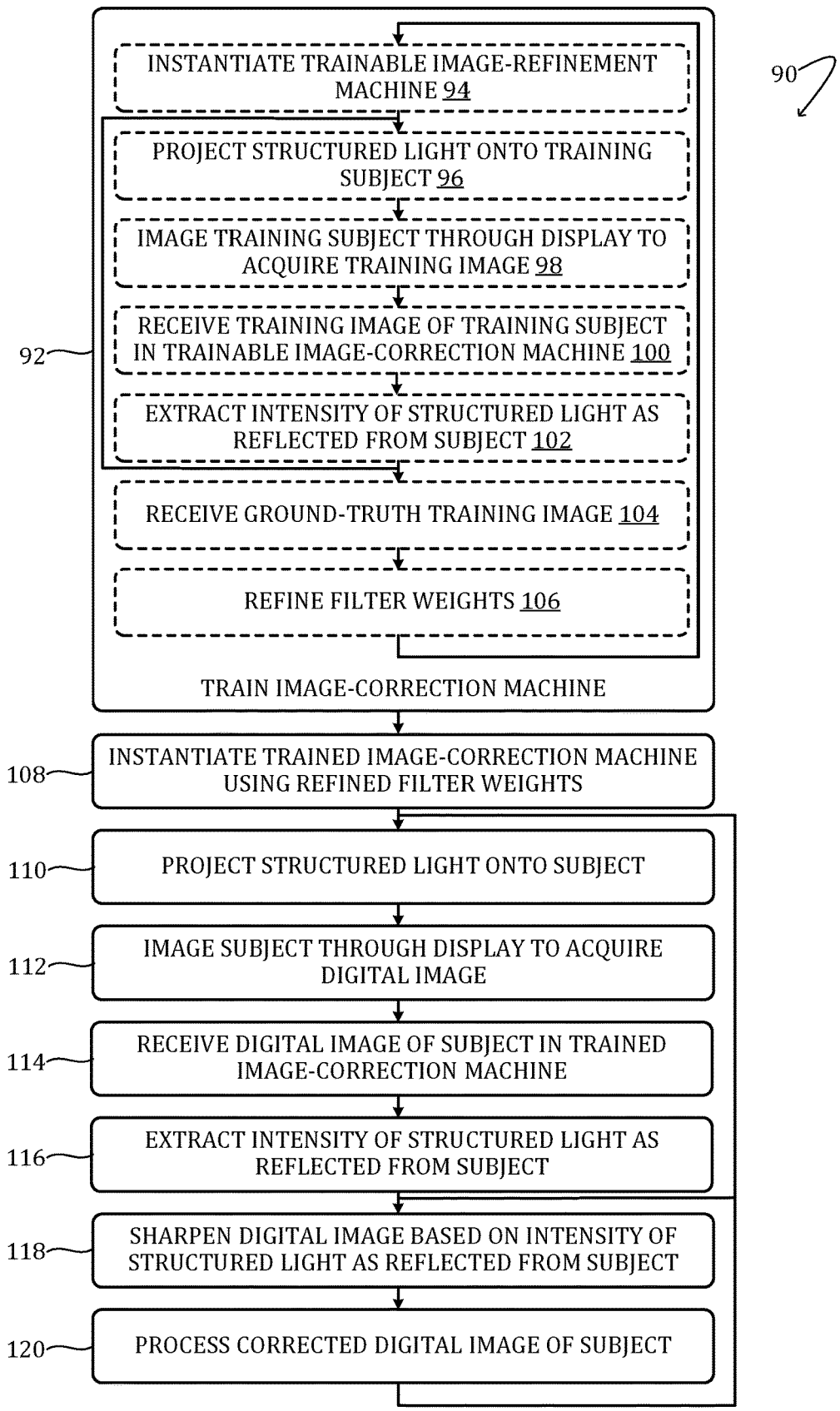
FIG. 14 shows aspects of an example method to acquire at least one sharpened digital image of a subject.

FIG. 14 illustrates aspects of an example method 90 to acquire at least one sharpened digital image of a subject. Aspects of method 90 may be enacted autonomously by an electronic device, such as any electronic device 10 above. Aspects of method 90 also may be enacted by other kinds of electronic devices. In variants in which the imaging-system computer of the electronic device includes a trainable image-sharpening machine, method 90 may include, at 92, a training phase enacted by a training-system computer before any corrupted digital image is received by the imaging-system computer. In variants in which the imaging-system computer employs only non-trainable image-sharpening algorithms, training phase 92 may be omitted.

Steps 94 through 106 show aspects of an example implementation of training phase 92. At 94 a trainable image-sharpening machine is instantiated in the training-system computer. At 96 structured illumination is projected onto a training subject. At 98 the training subject is imaged through a display, resulting in the acquisition of a training image. The display may include an optically diffractive structure, as described above. At 100 the training image is received in the trainable image-sharpening machine of the training-system computer. At 102 the spatially resolved intensity of the structured illumination as reflected by the training subject is extracted from the training image. Steps 96 through 102 may now be repeated for additional spatial phase offsets of the structured illumination. At 104 a ground-truth training image is received in the training-system computer. At 106 the filter weights used by the image-sharpening machine are computed and incrementally refined based on the series of training images acquired under the structured illumination and on a corresponding series of ground-truth images. The filter weights may be refined via back-propagation, annealing, or other machine-learning methods. Training phase 92 is now repeated for additional spatial phase offsets of the structured illumination and for additional training subjects until it is determined that the various filter weights are adequately refined. Although the description above makes reference to 'filter weights' and other aspects of trainable image-sharpening machine based on a CNN, various other types of trainable image-sharpening machines may be used instead. During the training of such machines, the values of various adjustable parameters may be refined and/or optimized. Any such parameter value, whether embodied as a filter weight, matrix coefficient, or other numerical value, may be provided at the conclusion of the training phase to the image-sharpening machines of one or more imaging-system computers.

Steps 108 through 122 show aspects of an example application phase of method 90. At 108 a trained image-sharpening machine is instantiated in the imaging-system computer of the electronic device. The trained image-sharpening machine may use the filter weights as refined during training phase 92, for example. At 110 structured illumination is projected onto a subject. At 112 the subject is imaged through a display, resulting in the acquisition of a digital image. The display may include an optically diffractive structure, such that imaging the subject includes collecting structured and ambient illumination reflected by the subject and subsequently diffracted by the optically diffractive structure. In examples in which the display includes an optically diffractive structure, projecting the structured illumination at 110 may include illuminating the optically diffractive structure—e.g., from a side opposite the subject. At 114 the digital image is received in the trained image-sharpening machine of the imaging-system computer. At 116 the spatially resolved intensity of the structured illumination as reflected by the subject and subsequently diffracted by the optically diffractive structure is extracted from the digital image. Steps 108 through 116 may now be repeated for additional spatial phase offsets of the structured illumination. At 118 at least one of the one or more digital images received is sharpened by execution of the trained image-sharpening machine, based on the spatially resolved intensity of the structured illumination as reflected by the subject and subsequently diffracted by the optically diffractive structure. As described hereinabove, sharpening at least one of the one or more digital images received may include reversing a diffractive effect of the optically diffractive structure on the one or more digital images. At 120 a sharpened digital image of the subject is further processed—e.g., by executing facial recognition or other biometric analysis, gaze tracking, etc., as described above.

No aspect of this disclosure should be understood in a limiting sense, because numerous variations, extensions, and omissions are also envisaged. For instance, although a trainable image-sharpening machine appears in the description above as an appropriate processing construct for the image corrections herein, that feature is not entirely necessary. In other implementations, appropriate sharpening to reverse the corrupting influence of the display on the subject image may enacted algorithmically in the Fourier domain, via a non-trainable image-sharpening machine. In still other implementations, an suitably configured, trainable image-sharpening machine may be trained and used to enact image-sharpening in the Fourier domain.

Furthermore, although the description above identifies OLED and LCD displays as representative display variant having optically diffractive display architectures, the image-sharpening herein are not limited to these display technologies. Rather, the image sharpening herein may be compatible with any electronic device in which a camera is arranged behind a display.

Further still, although the description above identifies optical diffraction as the primary source of image corruption when a subject is imaged through a display, the methods and configurations herein are applicable also to correcting for the effects of absorption by the display. This feature is most valuable in scenarios in which the average transmittance of the display is subject to change, such as in an LCD display. Moreover, the methods and configurations herein may also be applicable to correcting for the effects of scattering by the display architecture, which typically results in an overall loss of contrast in the subject image, In the present context, scattering differs from diffusion only in that the various scattering centers on a display are randomly arranged and may attenuate higher spatial frequencies than the pixel pattern of the display. Naturally, concurrent correction for the combined effects of diffraction, scattering and/or absorption by the display is also envisaged. The methods and configurations herein may also be applicable to correction for lens aberrations and other forms of image degradation.

Finally, although this disclosure primarily details the use of structured IR illumination for interrogating and reversing image corruption caused by a display, the analysis reported herein is also applicable to sharpening using unstructured IR illumination. Referring again to the MTF of FIG. 8B, it will be noted that the subsidiary bands in the IR plot partially 'fill in' the spatial-frequency region between the visible cutoff and the subsidiary maximum of the visible. Thus, in a scenario in which the subject is illuminated from the device with unstructured IR of a selected wavelength range, the ratio of the MTF in that range to the MTF in the red, green, and blue channels (from FIG. 8A, for example) may be used as a scaling factor for the red, green, and blue components in the Fourier domain. Suitable IR illumination may be projected through the display or from the periphery of the display, for example.

The methods and processes described herein may be tied to a computer of one or more computing devices. Such methods and processes may be implemented as an application program or service, an application programming interface (API), a library, and/or other computer-program product.

Referring again to FIGS. 4 and 12, a schematic representation of a computer 52 is shown in the form of imaging-system computers 52H and 52J and training-system computer 52T. These computers may be configured to provide any, some, or all of the computer functionality disclosed herein. Computer 52 may take the form at least one personal computer, game-system computer, tablet computer, smartphone computer, or any other computing device.

Computer 52 includes a logic system 122 and a computer-memory system 124. Computer 52 may optionally include a display system, an input system, a communication system, and/or other systems not shown in the drawings.

Logic system 122 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 124 includes at least one physical device configured to temporarily and/or permanently hold computer information, such as data and instructions executable by logic system 122. When the computer-memory system includes two or more devices, the devices may be collocated or remotely located. Computer-memory system 124 may include at least one volatile, nonvolatile, dynamic, static, read/write, read-only, random-access, sequential-access, location-addressable, file-addressable, and/or content-addressable computer-memory device. Computer-memory system 110 may include at least one removable and/or built-in computer-memory device. When the logic system executes instructions, the state of computer-memory system 124 may be transformed—e.g., to hold different data.

Aspects of logic system 122 and computer-memory system 124 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 122 and computer-memory system 124 may cooperate to instantiate one or more logic machines or engines. As used herein, the terms 'machine' and 'engine' each refer collectively to a combination of cooperating hardware, firmware, software, instructions, and/or any other components that provide computer functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer processor) cooperating with a remote component (e.g., a cloud computing service provided by a network of one or more server computers). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or more machines include support vector machines, multilayer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)). When a machine is trained for a classification task using images of human training subjects, the images may derived from a diverse population of training subjects, in order to avoid bias in any trained machine.

When included, a display system may be used to present a visual representation of data held by computer-memory system 124. The visual representation may take the form of a graphical user interface (GUI) in some examples. The display system may include one or more display devices utilizing virtually any type of technology. In some implementations, display system may include one or more virtual-, augmented-, or mixed reality displays.

When included, an input system may comprise or interface with one or more input devices. An input device may include a sensor device or a user input device. Examples of user input devices include a keyboard, mouse, or touch screen.

When included, a communication system may be configured to communicatively couple computer 52 with one or more other computers. The communication system may include wired and/or wireless communication devices compatible with one or more different communication protocols. The communication system may be configured for communication via personal-, local- and/or wide-area networks.

To further summarize, one aspect of this disclosure is directed to an electronic device comprising a display, an illumination source configured to project structured illumination onto a subject, a camera, and a logic system. The camera is configured to image the subject through the display, wherein imaging the subject includes collecting the structured illumination as reflected by the subject. The logic system is configured to receive from the camera a digital image of the subject imaged through the display and to sharpen the digital image based on a spatially resolved intensity of the structured illumination as reflected by the subject.

In some implementations, imaging the subject includes collecting ambient illumination reflected by the subject, and the digital image records a spatially resolved intensity of the ambient illumination as reflected by the subject. In some implementations, the ambient illumination includes visible illumination, and the structured illumination includes infrared illumination. In some implementations, the digital image records the spatially resolved intensity of the structured illumination as reflected by the subject. In some implementations, the illumination source and the camera are arranged behind the display. In some implementations, the display includes an optically diffractive structure, and imaging the subject includes collecting illumination reflected by the subject and diffracted by the optically diffractive structure en route to the camera. In some implementations, the illumination source is configured to project the structured illumination by illuminating the optically diffractive structure. In some implementations, sharpening the digital image includes reversing a diffractive effect of the optically diffractive structure on the digital image. In some implementations, the structured illumination includes a one-dimensionally periodic interference pattern. In some implementations, the display is an organic light-emitting diode display. In some implementations, the logic system includes an image-sharpening machine trained by receiving a plurality of filter weights refined by machine learning.

Another aspect of this disclosure is directed to a method to acquire a sharpened digital image of a subject. The method comprises: projecting structured illumination onto the subject; imaging the subject through a display to acquire a digital image, wherein imaging the subject includes collecting the structured illumination as reflected by the subject and transmitted through the display; and sharpening the digital image based on a spatially resolved intensity of the structured illumination as reflected by the subject.

In some implementations, the display includes an optically diffractive structure, and imaging the subject includes collecting illumination reflected by the subject and diffracted by the optically diffractive structure en route to the camera. In some implementations, projecting the structured illumination includes illuminating the optically diffractive structure. In some implementations, sharpening the digital image includes reversing a diffractive effect of the optically diffractive structure on the digital image. In some implementations, sharpening the digital image includes sharpening in an image-sharpening machine trained via machine learning. In some implementations, the image-sharpening machine is trained with a series of training images acquired under structured illumination and associated with a corresponding series of ground-truth images.

Another aspect of this disclosure is directed to an electronic device comprising an organic light-emitting diode display including an optically diffractive structure, an illumination source configured to project structured illumination onto a subject by illuminating the optically diffractive structure, a camera, and a logic system. The camera is configured to image the subject through the display, wherein imaging the subject includes collecting the structured illumination as reflected by the subject and diffracted by the optically diffractive structure en route to the camera. The logic system is configured to receive from the camera a digital image of the subject imaged through the optically diffractive structure and to sharpen the digital image based on a spatially resolved intensity of the structured illumination as reflected by the subject and diffracted by the optically diffractive structure en route to the camera.

In some implementations, the structured illumination includes a one-dimensionally periodic interference pattern. In some implementations, the illumination source is a coherent, infrared illumination source.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electronic device comprising:
   a display;
   an illumination source configured to project structured illumination onto a subject;
   a camera configured to image the subject through the display, wherein imaging the subject includes collecting the structured illumination as reflected by the subject; and
   a logic system configured to receive from the camera a digital image of the subject imaged through the display and to sharpen the digital image based on a spatially resolved intensity of the structured illumination as reflected by the subject.

2. The electronic device of any preceding-claim 1 wherein the digital image records the spatially resolved intensity of the structured illumination as reflected by the subject.

3. The electronic device of claim 2 wherein the ambient illumination includes visible illumination, and wherein the structured illumination includes infrared illumination.

4. The electronic device claim 1 wherein the illumination source and the camera are arranged behind the display.

5. The electronic device of claim 1 wherein the display includes an optically diffractive structure, and wherein imaging the subject includes collecting illumination reflected by the subject and diffracted by the optically diffractive structure en route to the camera.

6. The electronic device of claim 5 wherein the illumination source is configured to project the structured illumination by illuminating the optically diffractive structure.

7. The electronic device of claim 5 wherein sharpening the digital image includes reversing a diffractive effect of the optically diffractive structure on the digital image.

8. The electronic device of claim 1 wherein the structured illumination includes a one-dimensionally periodic interference pattern.

9. The electronic device of claim 1 wherein the display is an organic light-emitting diode display.

10. The electronic device of claim 1 wherein the logic system includes an image-sharpening machine trained by receiving a plurality of filter weights refined by machine learning.

11. The electronic device of claim 1 wherein imaging the subject includes collecting ambient illumination reflected by the subject, and wherein the digital image records a spatially resolved intensity of the ambient illumination as reflected by the subject.

12. A method to acquire a sharpened digital image of a subject, the method comprising:
projecting structured illumination onto the subject;
imaging the subject through a display to acquire a digital image, wherein imaging the subject includes collecting the structured illumination as reflected by the subject and transmitted through the display; and
sharpening the digital image based on a spatially resolved intensity of the structured illumination as reflected by the subject.

13. The method of claim 12 wherein the display includes an optically diffractive structure, and wherein imaging the subject includes collecting illumination reflected by the subject and diffracted by the optically diffractive structure en route to the camera.

14. The method of claim 13 wherein projecting the structured illumination includes illuminating the optically diffractive structure.

15. The method of claim 13 wherein sharpening the digital image includes reversing a diffractive effect of the optically diffractive structure on the digital image.

16. The method of claim 12 wherein sharpening the digital image includes sharpening in an image-sharpening machine trained via machine learning.

17. The method of claim 12 wherein the image-sharpening machine is trained with a series of training images acquired under structured illumination and associated with a corresponding series of ground-truth images.

18. An electronic device comprising:
an organic light-emitting diode display including an optically diffractive structure;
an illumination source configured to project structured illumination onto a subject by illuminating the optically diffractive structure;
a camera configured to image the subject through the display, wherein imaging the subject includes collecting the structured illumination as reflected by the subject and diffracted by the optically diffractive structure en route to the camera; and
a logic system configured to receive from the camera a digital image of the subject imaged through the optically diffractive structure and to sharpen the digital image based on a spatially resolved intensity of the structured illumination as reflected by the subject and diffracted by the optically diffractive structure en route to the camera.

19. The electronic device of claim 18 wherein the structured illumination includes a one-dimensionally periodic interference pattern.

20. The electronic device of claim 18 wherein the illumination source is a coherent, infrared illumination source.

* * * * *